(12) United States Patent
Kumar

(10) Patent No.: US 10,467,022 B2
(45) Date of Patent: *Nov. 5, 2019

(54) MEASUREMENT DEVICE AND METHOD FOR CONFIGURING AND UPGRADING MEASUREMENT SOFTWARE

(71) Applicant: Rohde & Schwarz GmbH & Co. KG, München (DE)

(72) Inventor: Nikhil Kumar, Fremont, CA (US)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 188 days.

This patent is subject to a terminal disclaimer.

(21) Appl. No.: 15/344,475

(22) Filed: Nov. 4, 2016

(65) Prior Publication Data

US 2018/0129515 A1    May 10, 2018

(51) Int. Cl.
| | |
|---|---|
| *G06F 9/445* | (2018.01) |
| *G06F 8/60* | (2018.01) |
| *G06F 8/654* | (2018.01) |
| *G06F 8/65* | (2018.01) |
| *G06F 11/30* | (2006.01) |

(52) U.S. Cl.
CPC ............ *G06F 9/44505* (2013.01); *G06F 8/60* (2013.01); *G06F 8/65* (2013.01); *G06F 8/654* (2018.02); *G06F 11/30* (2013.01)

(58) Field of Classification Search
CPC ...... H04W 24/08; G06F 8/60; G06F 9/44505; G06F 8/654
USPC ........................................................ 717/173
See application file for complete search history.

(56) References Cited

U.S. PATENT DOCUMENTS

| | | | | |
|---|---|---|---|---|
| 5,784,299 A * | 7/1998 | Evers | .................... | G01R 27/28 324/601 |
| 7,453,931 B2 * | 11/2008 | Minihold | ............ | H04L 27/2332 375/224 |
| 8,706,046 B2 * | 4/2014 | Mellein | .................. | H04B 17/21 375/224 |
| 9,618,496 B2 * | 4/2017 | Troxler | ................ | A01K 15/023 |
| 9,658,741 B2 * | 5/2017 | Pauly | .................. | G06F 3/04842 |
| 2004/0207637 A1 * | 10/2004 | Pauly | ................. | G01R 31/2841 345/619 |
| 2009/0110041 A1 * | 4/2009 | Mellein | .................. | H04B 17/21 375/224 |
| 2010/0141239 A1 * | 6/2010 | Ortler | .................... | G01R 27/28 324/76.39 |

(Continued)

*Primary Examiner* — Duy Khuong T Nguyen
*Assistant Examiner* — Theodore E Hebert
(74) *Attorney, Agent, or Firm* — Shumaker & Sieffert, P.A.

(57) ABSTRACT

A measurement device is disclosed for carrying out measurements on a system to be measured. For configuring the measurement software to be run by a processor controlling at least one measuring unit of the measurement device, the measurement device comprises a configuration unit which can configure the measurement software to comprise certain measurement features needed for the measurements. The configuration unit displays a configuration screen on a display unit wherein the configuration screen contains a plurality of user-selectable configuration options. This enables the user to receive information about the current software and hardware configuration and to be actively involved in the configuration process. The invention is particularly useful for RF sensitive measurement devices.

16 Claims, 5 Drawing Sheets

(56) References Cited

U.S. PATENT DOCUMENTS

| | | | | |
|---|---|---|---|---|
| 2011/0224935 | A1* | 9/2011 | Hampel | G01D 4/004 |
| | | | | 702/85 |
| 2014/0254405 | A1* | 9/2014 | Mellein | H04W 24/02 |
| | | | | 370/252 |
| 2014/0305232 | A1* | 10/2014 | Troxler | A01K 15/023 |
| | | | | 73/866 |
| 2015/0309716 | A1* | 10/2015 | Pauly | G06F 3/04842 |
| | | | | 715/771 |
| 2015/0317151 | A1* | 11/2015 | Falcy | H04L 67/28 |
| | | | | 717/173 |
| 2017/0039372 | A1* | 2/2017 | Koval | H04W 4/38 |
| 2017/0235911 | A1* | 8/2017 | Chen | G16H 10/60 |
| | | | | 705/2 |
| 2018/0129515 | A1* | 5/2018 | Kumar | G06F 8/654 |

\* cited by examiner

MEASUREMENT DEVICE AND METHOD FOR CONFIGURING AND UPGRADING MEASUREMENT SOFTWARE

FIELD OF THE INVENTION

The present invention relates to a device and method for configuring measurement software in a measurement device. The present invention also relates to a computer readable program product for carrying out such a configuration on a measurement device.

BACKGROUND OF THE INVENTION

Measurement devices which are also denoted as measurement instruments or measurement apparatus are used to determine parameters, conditions or generally physical quantities of a system which needs to be measured/tested. Modern measurement devices can typically communicate via the Internet with a remote storage location, for example from a manufacturer's site, to receive upgrades on the measurement software stored in a memory unit of the measurement device. Whilst this may be a convenient way of updating via a wireless or wired web interface, there are also disadvantages of this process, because it may cause an infection of the measurement device with malware, spam data, viruses etc.

Furthermore, measurement devices, for example those used for measuring conditions and physical conditions in a mobile communication network, are often RF sensitive and in this case any radio operation should be avoided at least during the measurement process and also during the configuration process such that an update by means of a wireless web interface is ruled out. For this reason, modern RF-sensitive measuring devices that are operated in an RF-sensitive environment are typically updated by removing the RF-sensitive measurement device from the RF-sensitive environment and by then performing the update in another non-RF sensitive environment. This is, however, very time consuming and especially not always practical, if for example the installation and consequently the upgrading of the measurement devices is very complex.

In addition, also the update or configuration of the measurement software on the measurement device is complex, considering that the measurement software, that is the measurement software package, comprises complex measurement features in a large number (sometimes 1000s of different features) and not all of them are usually required to be used and updated or even to be enabled or configured when an upgrade is desired or necessary. Furthermore, in most cases the measurement environment does not even necessitate the use of all available measurement features of the pre-installed or downloaded software package. For example, considering the case of measuring items in mobile communication networks, the measurement device may need to be upgraded from an UMTS measurement software package to an LTE measurement software package in a measurement device constituted by a network analyzer or similar. Neither for the case of the UMTS software package nor for the upgraded LTE software package the customer/user will have a need for using all measurement features actually available in the respective software package.

Since the measurement/testing software package is so complex, comprising many thousands of different measurement features, the configuration of the actual measurement software and consequently of the measurement device itself is usually done by a sales or service person who knows all these features (and useful feature combinations) and who will directly consult the customer which ones to use for certain measurement tasks or which ones to use additionally to existing measurement features. This can be imagined to be done by selecting features more or less manually from a table of available measurement feature options and by then enabling these measurement features by inputting a license key on the measurement device or by buying and downloading a measurement key from the manufacturer's site through an Internet connection.

Such complicated upgrade or re-configuration of measurement software is therefore typically only done via an email exchange between the customer and the product managers or, as explained, even in a face-to-face meeting with the customer. Not only is such an upgrade or reconfiguration process error-prone, but it also increases the downtime for the customer which results into frustrated or helpless customers. Furthermore, usually the customer does not even know about multi-dependencies between the different software measurement features. Since the customer/user has no opportunity or possibility to request an update, except through an email exchange or a face-to face meeting with the manufacturer, often upgrades are not provided on time for the reason that the RF sensitive measuring equipment is disconnected when carrying out its measurement function and will only be online again to receive upgrades when taken out of the RF sensitive environment.

On the side of the manufacturer, this causes missed opportunities of revenue recognition because a new configuration or upgrade will only be possible when the measurement device is taken out of operation and is reconnected via Internet.

Whilst the download of an upgrade in an RF sensitive environment can be replaced by downloading the upgrade in a wired connection, or by using an USB stick for upgrading the measurement device, there are also techniques for a so-called "incremental update" in order to reduce the amount of data that needs to be transferred via either a wired or wireless connection or the USB stick. In this case, a user of the measurement device can, when being connected through Internet, make a request for an update and only receive upgrades for measurement features which require an update whilst the remaining measurement features will remain unchanged. Whilst this decreases the amount of data and time needed for the upgrade or re-configuration, this still does not solve the problem that despite the "incremental upgrade" the user of the measurement device has no idea about suitable options for further packages or measurement features which the maintenance personnel of the manufacturer or the salesperson would recommend. That is, the user will not be provided with preferred and customized upgrades but rather a full upgrade or only at least a complete "incremental update" is performed automatically.

Consequently, there is a need for providing more versatile, comfortable and customer-oriented configuration and upgrade techniques of measurement software for measurement devices.

BRIEF SUMMARY OF THE INVENTION

The present invention provides measurement devices and methods which achieve a more comfortable and customer-oriented configuration and upgrade of measurement software used in measurement devices, in particular in RF sensitive measurement devices.

Specifically, a first aspect of the invention provides a measurement device for carrying out measurements on a system to be measured, comprising at least one measuring unit, a memory unit, a processor coupled to the at least one measuring unit and the memory unit and adapted to execute software stored in the memory unit and based thereon to control the measuring unit to carry out the measurements on the system to be measured, and a configuration unit coupled to the memory unit and adapted to configure measurement software with predetermined measurement features and store the configured measurement software in the memory unit to be executed by the processor.

Furthermore, a second aspect of the invention provides a measurement device for carrying out measurements on a system to be measured, comprising at least one measuring unit, a memory unit, a processor coupled to the at least one measuring unit and the memory unit and adapted to execute measurement software stored in the memory unit and based thereon to control the measuring unit to carry out the measurements on the system to be measured, and a display unit coupled to the processor unit and the memory unit and adapted to display a configuration screen with user-selectable configuration options for configuring the measurement software to comprise one or more predetermined measurement features.

In addition, a third aspect of the invention provides a configuration method for configuring measurement software in a measurement device for carrying out measurements on a system to be measured, comprising the following steps of displaying on a display unit of the measurement device a configuration screen with user-selectable measurement feature options, and configuring a measurement software in a memory unit of the measurement device dependent on the measurement features selected by a user from the configuration screen.

Finally, a fourth aspect of the invention provides a non-transitory computer readable medium storing instructions which, when executed on a processor of a measurement device, cause the processor to carry out the step of displaying on a display unit of the measurement device a configuration screen with user-selectable measurement feature options, and configuring a measurement software in a memory unit of the measuring device dependent on the measurement features selected by a user from the configuration screen.

It is a finding of the present invention that the measurement devices known so far have become more and more complex such that the measurement software which is for example pre-installed when the measurement device is purchased from the manufacturer needs to be customized, that is configured, according to the specific needs of the customer.

In order to avoid the cumbersome more or less manual setting of measurement features needed and paid for by the customer out of the vast number of available measurement features (options), the idea of the present invention is to equip the measurement device itself with a configurator which configures the measurement software (measurement software package) according to the measurement features requested by the user/customer. This is particularly advantageous for RF sensitive measurement devices because the configurator can perform the configuration according to the user needs even when the measurement device is off-line, that is in a RF shielded environment where no Internet connection to an upgrade location is possible. Furthermore, the configurator including a configuration screen on a display unit can suggest options to be used in connection with certain measurement features and it can also analyze the existing hardware and software configuration and display it to the user. Even if the configurator needs to wait until it is reconnected to the Internet, the user can already set the customization/configuration options and likewise, the manufacturer can offer options and marketing material through the configuration screen.

Further advantageous features and improvements of the invention will become apparent from the subsequent detailed description and the appended claims, taken in conjunction with the accompanying drawings and the preceding background.

BRIEF DESCRIPTION OF THE DRAWINGS

Hereinafter, the present invention will be described with more details in conjunction with the following drawing figures in which similar reference numerals denote similar elements or steps.

In the drawings.

DETAILED DESCRIPTION OF THE INVENTION

Hereinafter, embodiments of the present invention are described with reference to the attached drawings. However, it should be noted that the following detailed description is merely exemplary in nature and is not intended to limit the invention or the application and uses of the invention. As used herein, the word "exemplary" means "serving as an example, instance, or illustration". Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, the background and the brief summary of the following detailed description.

Figure 1:
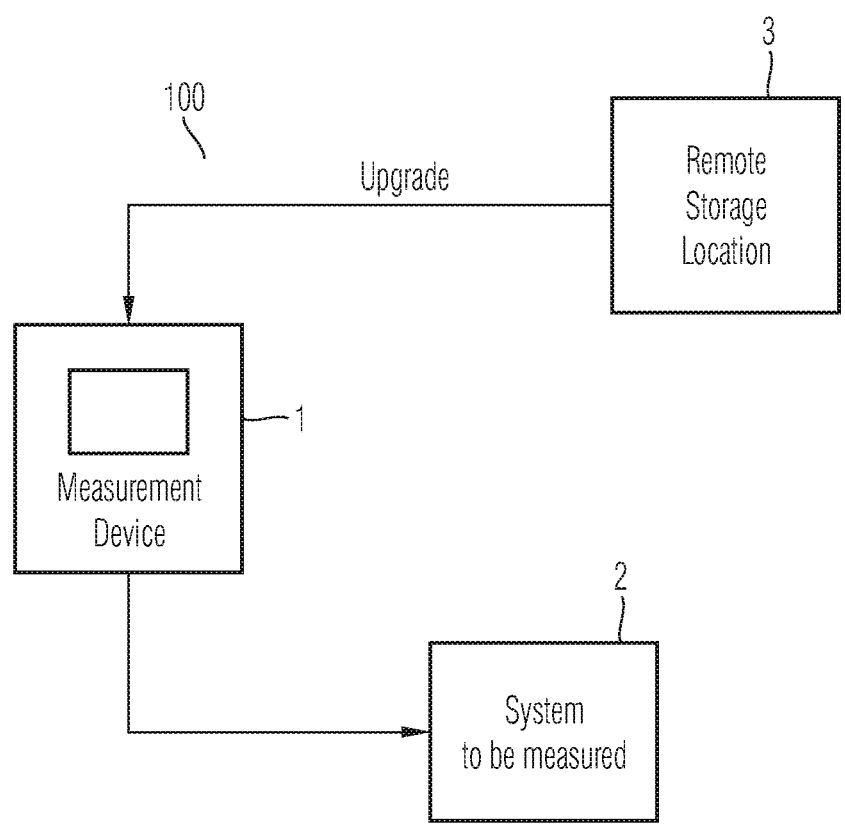
FIG. 1 shows a measurement device receiving an upgrade from a remote storage location in accordance with the prior art.

Referring now to FIG. 1, a functional block diagram of details of a conventional upgrade of measurement software in a measurement device 1 is shown. FIG. 1 shows in particular a system 100 for upgrading measurement software in the measurement device 1 which is to carry out measurements on a system to be measured indicated with reference numeral 2, in accordance with the prior art. The remote storage location 3 stores software packages or individual measurement features with which the measurement device 1 needs to be upgraded. In addition to the downloading of an upgraded software package from the remote storage location 3, the measurement software, when it has been downloaded to the measurement device 1, needs to be further configured to the specific needs of the customer of the measurement device 1. One example of such an upgrade is when the measurement device 1 is adapted to carry out measurements on a mobile communication network and typical software packages which are downloaded from the remote storage location 3 for this purpose are an LTE measurement software package, an UMTS measurement software package or a GSM measurement software package.

As is well known, the LTE or UMTS standards comprise hundreds of different aspects which could be measured in a mobile communication system. Therefore, most likely, the customer only buys a license for a certain group of measurement features. In this case, the measurement device 1 needs to be configured in accordance with the needs of the customer who for example might only want to measure a measurement task "handover" in the mobile communication system. However, in the system 100 shown in FIG. 1, the measurement device 1 is more or less "blind" and needs to be manually or remotely adapted to comprise the measurement features necessary for carrying out only the measurement task "handover".

Other specific examples of measurement tasks could be "Paging Measurements", "Cell Reselection Measurements", "Data Transmission Measurements", "SNR Interference Ratio Measurements" and many many others. It will be appreciated that these general measurement tasks will require the setting ("configuring") of a number of measurement features, for example the "handover" will also require a measurement feature "Field Strength Measurements".

As explained above, therefore, an experienced service person of the manufacturer of the measurement device 1 needs to be consulted to set certain measurement features and the customer/owner of the measurement device 1 needs to buy certain licenses either for the entire measurement software package or for individual measurement features thereof.

Whilst the configuration/setting can be done manually on the measurement device 1 or remotely, when the measurement device 1 is connected to the remote storage location 3, the configuration becomes extremely cumbersome because the customer/owner of the measurement device 1 is not involved in the actual configuration process. As explained, typically, a salesperson or a maintenance person visits the customer of the measurement device 1 with a long list of recommendable measurement features. It is this experienced person who will also recommends certain measurement features to the customer and after a time-consuming and cumbersome process finally the measurement software to be run by the measurement device 1 will have been configured and is then ready to be executed by the processor.

Furthermore, especially if the measurement device 1 is sensitive to RF environment an on-line setting/configuration of the measurement device 1 is not possible. This is usually the case if the measurement device 1 operates in an RF shielded environment in which no connection is possible or desired to the outside environment.

Figure 2:
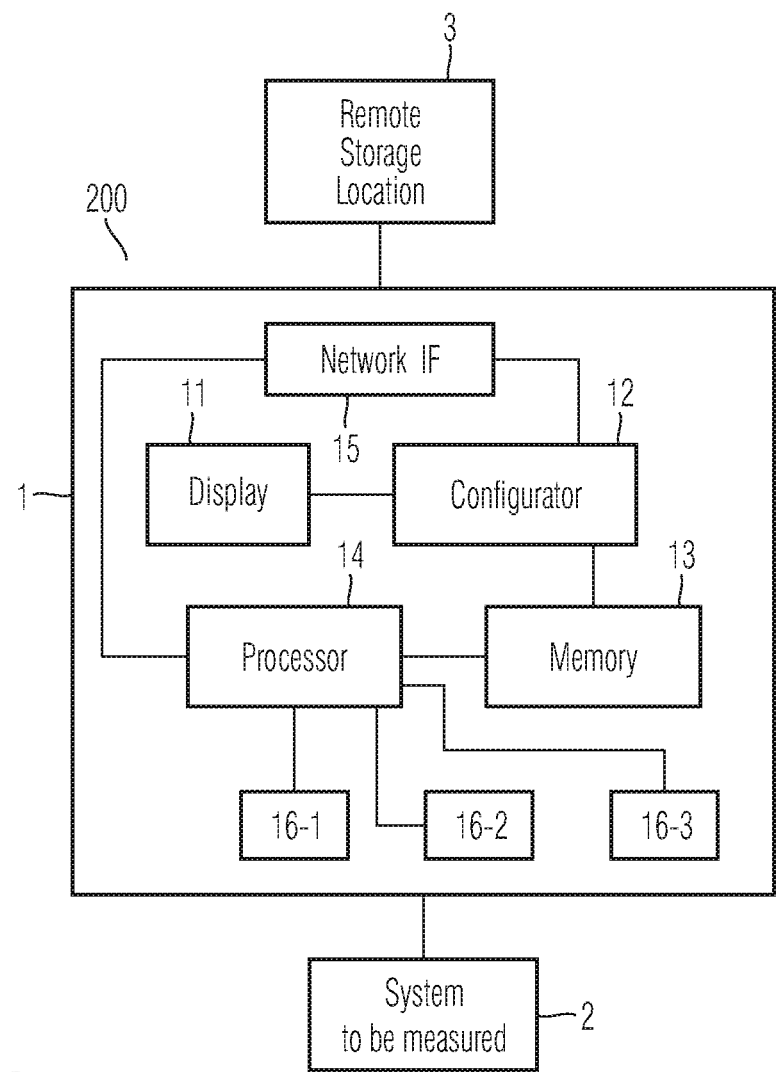
FIG. 2 shows a measurement device in accordance with embodiments of the present invention.

FIG. 2 shows an embodiment of the measurement device 1 according to an embodiment of the invention which solves the aforementioned aspects.

In the configuration system 200 the measurement device 1 carries out measurements on a system 2 to be measured similarly as in FIG. 1. For this purpose it uses one or more measuring units 16-1, 16-2 to 16-N. A memory unit 13 is coupled to a processor 14 and a configuration unit 12. The processor 14 is adapted to execute measurement software stored in the measurement unit 13. In particular, the processor 14 is adapted to run the measurement software and to control the measuring units to carry out the measurements on the system 2 to be measured in accordance with the executed commands of the measurement software.

The configuration unit 12 is coupled to the memory unit 13 and is adapted to configure measurement software with one or more predetermined measurement features 131-1 to 131-N and/or 132-1 to 132-M as exemplary shown in FIG. 4 (and discussed below). Once the configuration unit 12 has configured the measurement software it stores the result, that is the configured measurement software, in the memory unit 13 to be executed by the processor 14. The measurement device 1 also comprises a network interface 15 which will be described below.

The measurement software which is configured by the configuration unit 12 can be, in one embodiment of the invention, a measurement software package which has been originally pre-installed in the memory unit 13 at purchase and which is further configured by the measurement device-specific configuration unit 12 to comprise measurement features which are needed for the specific measurement task desired by a customer. In another embodiment, the measurement software which needs to be configured by the configuration unit can be a measurement software package which has just been downloaded as an upgrade from the remote storage location 3 into an intermediate memory. Before this measurement software is stored in the memory that 13 it can be configured with the necessary measurement features by the configuration unit 12.

In accordance with one embodiment of the invention, the configuring of the measurement software package which includes one or more configurable measurement features comprises the enablement of one or more of the measurement features, for example by requesting a license key to be input into the measurement device 1 manually or remotely via the network interface 15, for example via an Internet connection to a website of the manufacturer.

Since a configuration unit 12 is provided locally in the measurement device 1 itself, this avoids the necessity of a specialized service or maintenance person to set the individual required measurement features that are necessary for a specific measurement task. Again referring to the example of a mobile communication system, therefore, the locally provided configuration unit 12 can for example determine and select one or more measurement features necessary for the overall measurement task "Handover Measurements", for example a first measurement feature 131-1 "Field Strength Measurement", a second measurement feature 131-2 "Cell ID Identification" and a third measurement feature 131-3 "Change of Serving Base Station Controller". It should be understood that this is only one example of configuring the measurement software to carry out a specific "measurement task". However, with reference to the example of a mobile communication system it is also understood that the measurement software can be configured to comprise any measurement software with the desired or selected measurement features to reside in the memory unit 13 and to be executed by the processor 14.

The measurement device 1 shown in FIG. 2 also comprises, in accordance with another embodiment of the invention, a display unit 11 adapted to display a configuration screen with user-selectable configuration options for configuring the measurement software residing in the memory 13 such that it comprises one or more of the predetermined or desired measurement features. In this manner, the configuration unit 12 is not only provided locally in the measurement device but also allows a user interaction through a user interface comprising the display unit. For example, in accordance with one embodiment of the invention, the configuration unit 12 can first of all check what the current configuration of the hardware and software in the measurement device 1 is. It can request the user to select and upgrade the hardware and software components. In accordance with another embodiment, the configuration unit 12 can also request the user to input a specific measurement task after which the configuration unit 12 will automatically analyze, collect and enable relevant measurement features of the currently stored measurement software package which are needed for carrying out the specifically requested measurement task. If the necessary or requested measurement feature is not found in the current measurement software package installed in the memory unit 13, the configuration unit 12 may also determine to request a download of a specific measurement software package including the missing measurement feature or a download of the specific measurement feature itself from the remote storage location 3. Therefore, the locally provided configuration unit 12 can preferably react to user requests and also suggest upgrades or other useful measurement features to the user on the configuration screen displayed on the display unit 11.

It may be noted that this type of configuration carried out by the configuration unit 12 can even be carried out when the measurement device 1 is off-line. In this case, in accordance with another embodiment of the invention, the configuration unit 12 registers the user requests for certain measurement features or upgrades thereof in an off-line state of the measurement device 1. Then, the measurement device 1 requests the download of the package and/or measurement feature once it is reconnected to a remote storage location 3 containing such features and/or upgrades thereof.

In this manner, the locally provided configuration unit 13 replaces the need of a service person or maintenance person to get involved in the setting/configuration of the final measurement software to be stored in the memory unit 13 and to be executed by the processor 14.

Figure 5:
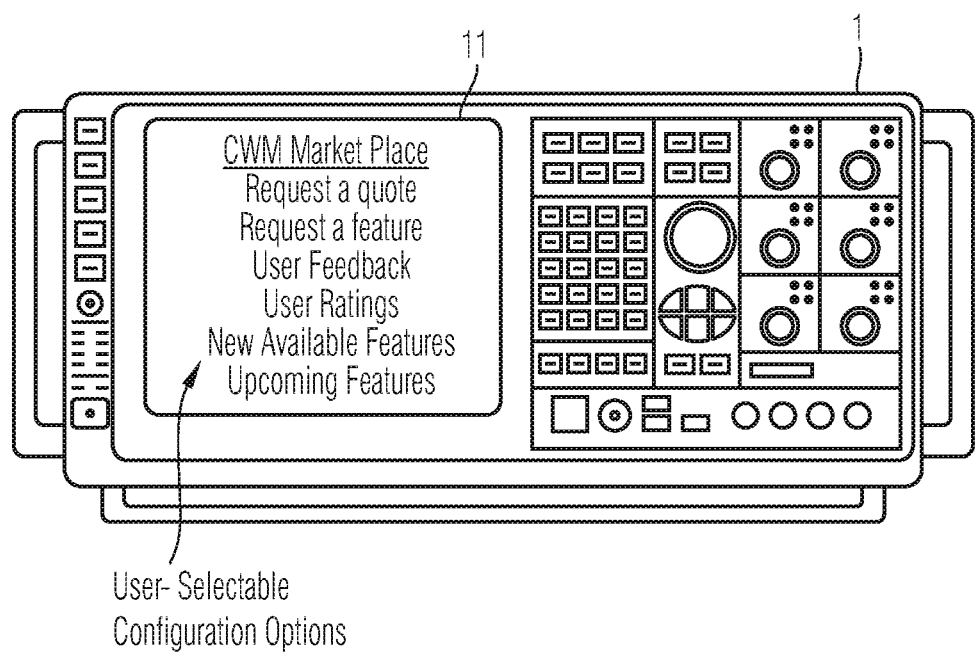
FIG. 5 shows a measurement device including a display screen with user-selectable configuration options.

FIG. 5 shows, in accordance with another embodiment of the invention, a configuration screen 11 with a number of user-selectable options. As will be understood from FIG. 5, the user interface with the display unit 11 coupled to the configuration unit 12 can display as the user-selectable configuration options a "Request Quote Option". Such an option can be used by the configuration unit 12 to first enquire about the price of the measurement feature to be enabled and to display such a quote to the user. Furthermore, as one of the user-selectable configuration options, also an option "Request a Feature" for requesting a certain measurement feature may be displayed. The interactive configuration screen on the display unit 11 may also provide an option for a "User Feedback" or even an option "User Ratings" for inputting user ratings. In accordance with another embodiment of the invention, one of the options can also be an option "New Available Features" to request new available measurement features or an option "Upcoming Features" to display upcoming measurement features. Some of these features may only be displayed if the measurement device 1 is connected to a remote storage location 3 provided by the manufacturer whilst other options, such as for example an option for an upgrade request, can be selected at any time, even if the measurement device 1 is not connected through the network interface 15 to an outside remote storage location 3. The manufacturer/provider of the measurement unit 1 can use the display screen 11 also for presenting marketing materials to the user. In this manner by using the interactive user interface with the configuration screen, the configuration unit can present selections of measurement features to the user to be selected by the user. Therefore, a service or maintenance person is neither needed locally at the measurement device 1 nor remotely.

The configuration unit 12 may use an intelligent logic to find out which measurement features (and software packages) are necessary to fulfil the user request for carrying out a specific measurement task. For example, in accordance with another embodiment of the invention, the display unit 11 may display a configuration screen and an indication about a measurement software package currently installed in the memory unit 13. Then, the configuration unit 12, based on a user-requested measurement feature, determines one or more other measurement software packages or measurement features which need to be installed in the memory unit 13 and which contain one or more user-requested measurement features.

Figure 3:
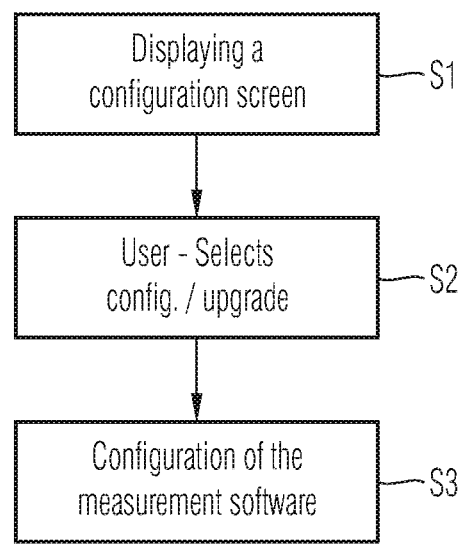
FIG. 3 shows a configuration method in accordance with an embodiment of the invention.

Using the display 11 shown in FIG. 2 and in FIG. 5, in accordance with another embodiment of the invention, the configuration method for configuring measurement software in the measurement device for carrying out measurements on a system to be measured comprises the steps shown in FIG. 3. In step S1 a configuration screen with user-selectable measurement feature options is displayed on the display unit 11 of the measurement device 1. In step S2 the user selects certain configuration/upgrading options and in step S23 the configuration unit 12 carries out the configuration and/or upgrade of the measurement software in the memory unit 13 dependent on the options, that is measurement features, selected by the user from the configuration screen. As explained above, the configuration of the measurement software in the memory unit 13 of the measurement device 1 may include the enabling of one or more measurement features of a pre-installed measurement software package, for example by inputting a license key.

As also explained, the configuration method in FIG. 3 may also comprise the download of a measurement feature (or an entire measurement software package) or upgrades thereof from the remote storage location 3 shown in FIG. 2 or even from a locally provided USB stick.

In accordance with another embodiment of the invention, for example when the user selects simply an upgrade of the existing and currently installed measurement software in the memory unit 13, this user request can be interpreted as an "incremental update request" such that only those measurement features which have changed with an upgrade will be downloaded from the remote storage location 3.

In accordance with yet another embodiment of the invention, the configuration unit 12, when invoked by a user, can first of all determine the existing (that is installed) measurement software package(s) and may determine the existing (currently active) measurement features installed in the memory unit 12.

In accordance with another embodiment of the invention the configuration unit 12 may be further adapted to also determine the existing hardware configuration that is the existing measuring units 16-1, 16-2 to 16-N. This may be advantageous because the upgrading and/or selection of certain measurement features may lead to the need of other specific measuring units which need to be installed or at least activated/enabled. Therefore, it may be understood that the configuration unit 12 does not only configure the measurement software to be executed by the processor 14 but it may additionally configure the hardware environment which is necessary for the measurements which has been configured/set by the selected measurement features.

In accordance with a particular use example of the present invention, the display unit 11 may indicate on the configuration screen a table which lists, for example in a pull-down menu or sub-menu, a number of associated measurement features which can be requested by the user. The display unit or respectively the configuration unit 12 may then, upon a user selecting one of the displayed measurement features, autonomously determine whether further measurement features need to be activated/enabled which the user might not even know about. For example, a user selection of an LTE measurement software package in the displayed configuration screen (or the selection of only a single measurement feature from this LTE software package) may lead to an indication on the configuration screen that also a UMTS basic measurement software package or a specific measurement feature of the UMTS measurement software package needs to be activated (if already residing in the memory unit 13) or needs to be downloaded and activated from the remote storage location 3. This example makes once more clear that the user does not need to involve a maintenance or service person to assist in the configuration of the measurement device 1 but that the provision of the local configuration unit 12 allows an active user involvement in the configuration of the measurement software without the need of external personnel.

Summarizing, while the prior art systems entirely rely on the expertise of specially trained personnel to set certain measurement features and/or select certain measurement software packages, that is the prior art measurement device 1 in FIG. 1 is essentially "blind", the measurement device 1 in accordance with the invention can involve the user in the configuration process. In this process, since the measurement device 1 is provided with a local configuration screen, the manufacturer can also "push" marketing material, offers, time of upgrade, upgrade options to the user. This can reduce the downtime during upgrade for the customer and can contribute to an error free configuration and upgrade of the measurement device.

Figure 6:
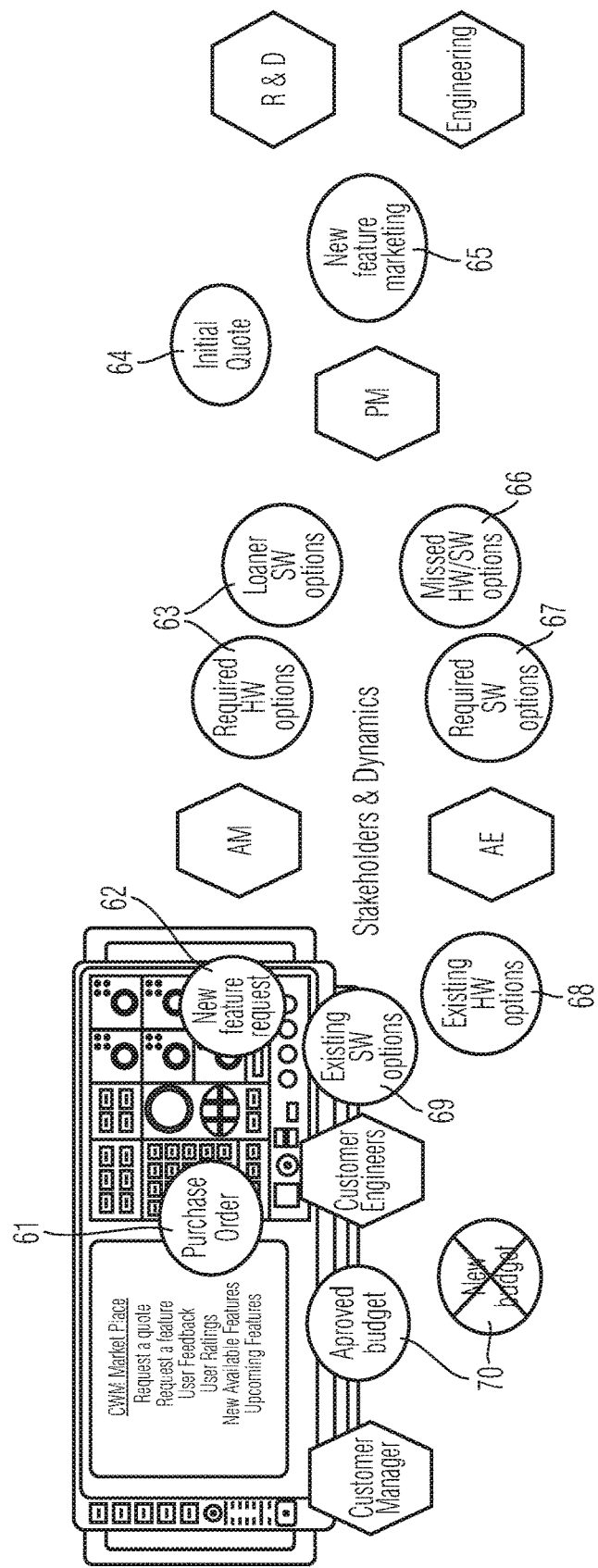
FIG. 6 shows a schematic diagram of user-selectable options and the exchange of information between the measurement device and the manufacturer's site.

As illustrated schematically in FIG. 6, an unlimited number of configuration options may be used by the configuration unit 12, and further examples of this are to place a purchase order 61, request a new feature 62, display required hardware options or software options 63, handle quotations 64, marketing activities 65 for a new feature, necessary or missed hardware/software options 66, 67, the determination (and display) of existing hardware options 68 or existing software options 69 and the improving/handling of a budget 70. Therefore, all the configuration steps which previously were very time-consuming, cumbersome and led to high downtimes, are now easy to handle for the user because the measurement device 1 in accordance with the invention is an active part, together with the user, for configuring, setting and upgrading the (measurement software in the) measurement device 1.

In accordance with yet another embodiment of the invention, the configuration unit is further adapted to evaluate whether the first predetermined measurement software package is at least partially dependent from a second predetermined measurement software package which is pre-installed in the memory unit. In this context, the "dependency" could relate to the fact that one or more of the first configurable measurement features 131-1, 131-2, 131-3 to 131-N of a first measurement software package 131 are identical to second configurable measurement features 132-1, 132-2, 132-3 to 132-M of a second measurement software package 132, as illustrated to be part of the memory unit 13 in FIG. 4. In FIG. 4 the dashed line around the second measurement software package 132 indicates that this package 132 might as yet not reside in the memory 13 but is in fact an upgrade to be downloaded from a remote location where it is still stored.

Figure 4:
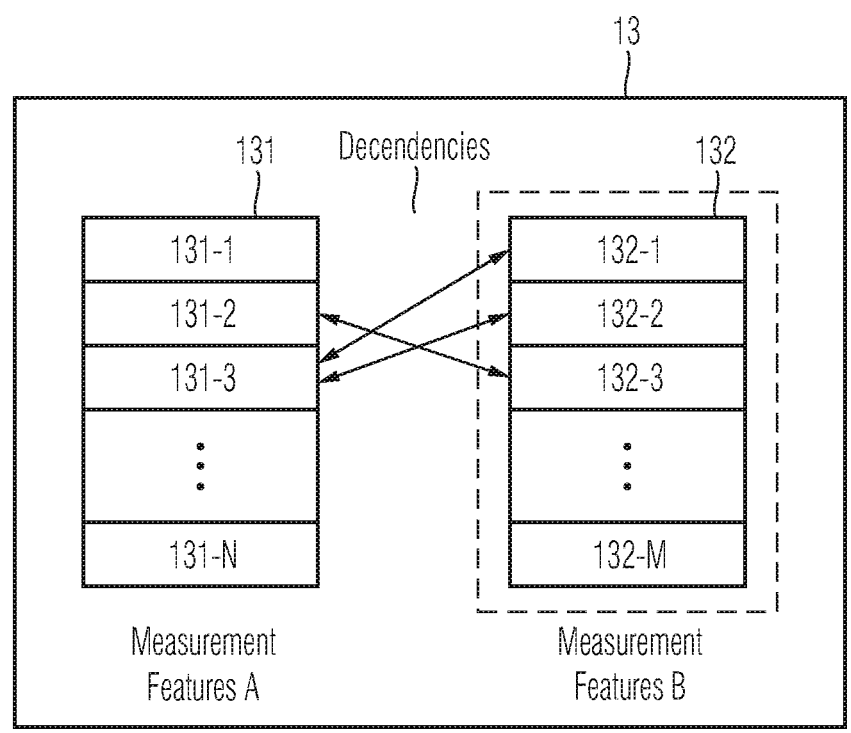
FIG. 4 shows the contents of the memory unit of the measurement device shown in FIG. 2, in particular showing the dependencies between different measurement features of two different measurement software packages.

The evaluation of "dependencies" and the adaption of the configuration process based on such an evaluation of dependencies is particularly useful if a first measurement software package, for example 131 in FIG. 4 which has already been pre-installed in the memory unit 13 needs to be upgraded. If the user selects an option to upgrade this first measurement software package, it may determine that some of the measurement features may at least partially be identical to those of a second measurement software package which has already been downloaded or is to be downloaded and the features of which (the measurement features of which) have as yet not been activated/enabled.

The example of the mobile communication system is once more useful to understand this embodiment of the invention. Assume for example that a first software measurement package relating to UMTS has already been installed/configured in the memory unit 12. If an upgrade to a higher version of this pre-installed UMTS measurement software package is requested by the user (through the configuration screen), then in principle the entire higher version of the UMTS standard or the LTE measurement software package could be installed/downloaded in its entirety. However, the configuration unit 12 can detect a dependency since of course the higher version standard will (also) use features from the lower version standard. For example, of course the LTE standard uses features from the UMTS standard and therefore, likewise the measurement feature relating to such a feature does not have to be reloaded and/or activated/enabled again because it is already resident and enabled in the memory unit 13. Therefore, as is indicated in FIG. 4 with the dependencies of the measurement features 131-2 and 132-3 and between the measurement feature 131-3 and the measurement features 132-1, 132-2 of the two different software packages 131, 132, the evaluation of dependencies of both measurement software packages can facilitate and improve the configuration process. In particular, this avoids unnecessary activation/enablement of measurement features which have already been enabled or do not require an upgrade.

Therefore, the knowledge which was previously only in the mind of the service and/or a maintenance person has been transferred to an intelligent configuration unit 12 residing on the measurement device 1 itself. As an intelligent platform the configuration unit 12 can, with or without a communication connection to the remote storage location 3 of the manufacturer, provide information about a useful configuration to the user who is simultaneously put into a position to be able to actively get involved in the configuration process. The configuration unit 12 will provide all the necessary information about certain associations of measurement features to be enabled and/or to be maintained from a previous lower version measurement software.

In this manner, the configuration unit 12 can also propose compatible update measuring applications and can assist and ensure the installation of the right packages, licenses and/or measurement features needed for the specific measurement task desired by the user.

INDUSTRIAL APPLICABILITY

Although above a specific example of measuring physical properties, parameters and conditions in a mobile communication system has been described, the skilled person will understand on the basis of the description, drawings and claims presented herein that the teachings of the invention may be applied to any measurement device which carries out certain measurement functions on a system to be tested. However, of course, the invention is particularly useful for measurement devices which are not constantly connected through a network connection to a manufacturer's site due to RF shielding aspects as explained above. Despite the fact that such measurement devices will at least occasionally not be connected to the manufacturer's site through a network condition/connection, a configuration may still take place by the user using the configuration unit locally provided in the measurement device.

In this document, relational terms such as first and second and the like may be used solely to distinguish one entity or action from another entity or action without necessarily requiring or implying any actual such relationship or order between such entities or actions. Numerical ordinals such as "first", "second", "third", etc. simply denote different singles of a plurality and do not imply any order or sequence unless specifically defined by the claim language. The sequence of the text in any of the claims does not imply that process steps must be performed in a temporal or logical order according to such a sequence unless it is specified specifically by the language of the claim. Therefore, the process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be coupled to each other physically, electronically, logically or in any other manner, through one or more additional elements.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Of course, a combination of the two approaches could be used.

Furthermore, while at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability or configuration of the invention in any way. Much rather, the foregoing detailed description will provide those skilled in the art with a convenient roadmap for implementing an exemplary embodiment of the invention it being understood that various changes may be made in the function and arrangement of elements described in an exemplary embodiment without departing from the scope of the invention as set forth in the following appended claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A measurement device for carrying out measurements on a mobile communication system to be measured, comprising:

at least one measuring unit;

a memory unit;
a processor coupled to the at least one measuring unit and the memory unit and adapted to execute software stored in the memory unit and based thereon to control the measuring unit to carry out the measurements on the mobile communication system to be measured;
a configuration unit coupled to the memory unit and adapted to configure measurement software with predetermined measurement features of mobile communications standards and store the configured measurement software in the memory unit to be executed by the processor,
 wherein the measurement software to be configured by the configuration unit is a first predetermined measurement software package for a first mobile communication standard including one or more first configurable measurement features pre-installed in the memory unit, wherein the configuration unit is adapted to enable one or more of the first configurable measurement features, and
 wherein the configuration unit is adapted to evaluate whether the first predetermined measurement software package for the first mobile communication standard comprising the one or more of the first configurable measurement features is with respect to the one or more of the first configurable measurement features at least partially dependent from a second predetermined measurement software package for a second mobile communication standard pre-installed in the memory unit, wherein the dependency relates to the fact that one or more of the first configurable measurement features of the first measurement software packages are identical to second configurable measurement features of the second predetermined measurement software package;
a network communication interface coupled to the configuration unit and the memory unit, wherein the network communication interface is adapted to communicate with a remote storage device storing one or more measurement software packages, and wherein the configuration unit based on the measurement features to be configured downloads one or more second measurement software packages determined to be dependent on the first predetermined measurement software package from the remote storage device through the network communication interface into the memory unit; and
a user interface with a display unit coupled to the configuration unit and adapted to display a configuration screen indicating user-selectable configuration options, wherein the user-selectable configuration options include one or more of the group consisting of a request quote option, a request measurement feature option, a user feedback option, a user ratings option, a new available measurement features option, an upcoming measurement features option, an upgrade request option and a marketing material presentation option.

2. The measurement device according to claim 1, wherein the display unit is further adapted to display on the configuration screen an indication about a current measurement software package installed in the memory unit, wherein the configuration unit, based on a user-requested measurement feature, determines one or more other measurement software packages or measurement features which need to be installed in the memory unit and containing one or more user-requested measurement features.

3. The measurement device according to claim 2, wherein the memory unit has pre-installed a measurement software package including a number of predetermined measurement features, wherein when the configuration unit determines that the user-requested measurement feature is not part of the installed measurement software package it downloads the user-requested measurement feature from the remote storage device.

4. The measurement device according to claim 1, wherein the network communication interface is coupled to the remote storage device through an Internet connection.

5. The measurement device of claim 1, wherein the configuration unit, when configuring one or more of the predetermined measurement features, prompts the user through a user interface for the input of a license key.

6. The measurement device of claim 1, wherein the configuration unit, when configuring one or more of the predetermined measurement features, downloads a license key from a remote storage device.

7. The measurement device of claim 1, wherein the measurement software to be configured by the configuration unit is an upgrade to a pre-installed first measurement software package pre-installed in the memory unit.

8. The measurement device of claim 1, wherein the configuration unit is further adapted to determine the existing measurement features installed in the memory unit.

9. The measurement device of claim 1, wherein the configuration unit is further adapted to determine the existing hardware options available on the measuring unit.

10. The measurement device according to claim 1, wherein the configuration unit is further adapted to determine the exact incremental measurement features to be upgraded when an update request from the user is received.

11. The measuring device according to claim 1, wherein the configuration unit is further adapted to determine whether one or more measurement features requested by a user require the enablement of further measuring units in the measuring device.

12. The measurement device according to claim 1, wherein the configuration unit is adapted to download one or more predetermined measurement features from a remote storage location as an upgrade.

13. The measurement device according to claim 1, wherein the first measurement software package is a LTE measurement software package and the second measurement software package is a 3G measurement software package.

14. A configuration method for configuring measurement software in a measurement device for carrying out measurements on a system to be measured, comprising the following steps:
displaying on a display unit of the measurement device a configuration screen with user-selectable measurement feature options, wherein the user-selectable configuration options include one or more of the group consisting of a request quote option, a request measurement feature option, a user feedback option, a user ratings option, a new available measurement features option, an upcoming measurement features option, an upgrade request option and a marketing material presentation option; and
configuring a measurement software in a memory unit of the measuring device dependent on the measurement features selected by a user from the configuration screen, wherein configuring the measurement software comprises:
evaluating dependencies of measurement features contained in a first measurement software package for a first mobile communication standard and measurements features contained in a second measurement software package for a second mobile communication standard; and downloading, based on the measurement features to be configured, one or more second measurement software packages determined to be dependent on the first predetermined measurement software package from the remote storage device through the network communication interface into the memory unit, wherein the dependency relates to the fact that one or more of the first configurable measurement features of the first measurement software packages are identical to second configurable measurement features of the second predetermined measurement software package.

15. The configuration method according to claim 14, wherein the configuration of the measurement software in the memory unit of the measuring device includes the enabling of a measurement feature of a pre-installed measurement software package.

16. A non-transitory computer readable medium storing instructions which, when executed on a processor of a measurement device for carrying out measurements on a mobile communication system, cause the processor to carry out the steps of:

displaying on a display unit of the measurement device a configuration screen with user-selectable measurement feature options, wherein the user-selectable configuration options include one or more of the group consisting of a request quote option, a request measurement feature option, a user feedback option, a user ratings option, a new available measurement features option, an upcoming measurement features option, an upgrade request option and a marketing material presentation option; and configuring a measurement software in a memory unit of the measuring device dependent on the measurement features selected by a user from the configuration screen, wherein configuring the measurement software comprises:

evaluating dependencies of measurement features contained in a first measurement software package for a first mobile communication standard and measurements features contained in a second measurement software package for a second mobile communication standard; and downloading, based on the measurement features to be configured, one or more second measurement software packages determined to be dependent on the first predetermined measurement software package from the remote storage device through the network communication interface into the memory unit, wherein the dependency relates to the fact that one or more of the first configurable measurement features of the first measurement software packages are identical to second configurable measurement features of the second predetermined measurement software package.

\* \* \* \* \*